United States Patent
Gerster et al.

(10) Patent No.: US 8,943,677 B2
(45) Date of Patent: Feb. 3, 2015

(54) METHOD FOR JOINING CORE LAMINATIONS BY ADHESIVE FORCE TO FORM A SOFT-MAGNETIC LAMINATED CORE

(75) Inventors: Joachim Gerster, Alzenau (DE); Witold Pieper, Gelnhausen (DE); Harald Staubach, Alzenau (DE); Dominik Fackelmann, Langenselbold (DE)

(73) Assignee: Vacuumschmelze GmbH & Co. KB, Hanau (DE)

( * ) Notice: Subject to any disclaimer, the term of this patent is extended or adjusted under 35 U.S.C. 154(b) by 391 days.

(21) Appl. No.: 13/257,033

(22) PCT Filed: Mar. 26, 2009

(86) PCT No.: PCT/IB2009/051264
§ 371 (c)(1),
(2), (4) Date: Nov. 21, 2011

(87) PCT Pub. No.: WO2010/109272
PCT Pub. Date: Sep. 30, 2010

(65) Prior Publication Data
US 2012/0156441 A1    Jun. 21, 2012

(51) Int. Cl.
*H01F 3/04* (2006.01)
*H01F 7/06* (2006.01)
(Continued)

(52) U.S. Cl.
CPC *H02K 1/02* (2013.01); *C22C 38/14* (2013.01); *C22C 38/12* (2013.01); *H01F 3/02* (2013.01);
(Continued)

(58) Field of Classification Search
USPC .................. 29/417, 592.1, 602.1, 604–606; 336/200, 234
See application file for complete search history.

(56) References Cited

U.S. PATENT DOCUMENTS 3,483,052 A    12/1969  Seidel et al.
3,634,072 A    1/1972   Ackermann
(Continued)

FOREIGN PATENT DOCUMENTS

AT    274128 B    9/1969
CH    299842 A    9/1954
(Continued)

OTHER PUBLICATIONS

Second Notice of Reasons for Rejection in Counterpart Japanese Application No. 2012-501397, Jun. 18, 2013.
(Continued)

*Primary Examiner* — Paul D Kim
(74) *Attorney, Agent, or Firm* — Dickinson Wright PLLC

(57) ABSTRACT

A method for joining core laminations by adhesive force to form a soft-magnetic laminated core by applying a coating that is wettable with epoxy resin to top sides and undersides of each sheet. The sheets are separated into core laminations made of soft-magnetic sheets, which are stacked to form a core lamination stack, and a cured adhesive introduced in a state of low viscosity into interstices between the core laminations. The core lamination stack has intermediate layers between the core laminations. For this purpose, the core laminations comprise a final-annealed, crystalline CoFe alloy, an adhesive-wettable top side and an adhesive-wettable underside. Together with the intermediate layers, the core laminations form a dimensionally accurate laminated core. The laminated core has a substantially adhesive-free contour consisting of contour surfaces of the core laminations. The adhesive is solvent-free in its low-viscosity state.

58 Claims, 6 Drawing Sheets

(51) Int. Cl.
    *C22C 38/14*     (2006.01)
    *C22C 38/12*     (2006.01)
    *H01F 3/02*     (2006.01)
    *C22C 30/00*     (2006.01)
    *H02K 1/02*     (2006.01)
    *H01F 1/18*     (2006.01)
    *H01F 41/02*     (2006.01)
    *C21D 8/12*     (2006.01)
    *H02K 15/02*     (2006.01)
    *C22C 38/10*     (2006.01)
    *C22C 19/07*     (2006.01)

(52) U.S. Cl.
    CPC   *C22C 30/00* (2013.01); *H01F 1/18* (2013.01); *H01F 41/0233* (2013.01); *C21D 8/12* (2013.01); *H02K 15/02* (2013.01); *C22C 38/10* (2013.01); *C22C 19/07* (2013.01)
    USPC .............. 29/609; 29/417; 29/592.1; 29/602.1; 336/200; 336/234

(56) References Cited

U.S. PATENT DOCUMENTS

| | | |
|---|---|---|
| 4,032,673 A | 6/1977 | Schroeter et al. |
| 4,591,529 A | 5/1986 | Behringer et al. |
| 4,614,022 A | 9/1986 | Bibbi et al. |
| 5,501,747 A | 3/1996 | Masteller et al. |
| 5,534,565 A | 7/1996 | Zupancic et al. |
| 6,071,339 A * | 6/2000 | Pandelisev .................... 117/200 |
| 6,383,326 B1 | 5/2002 | Ohman |
| 2004/0085174 A1 | 5/2004 | Decristofaro et al. |
| 2007/0137059 A1 | 6/2007 | Holzapfel et al. |
| 2008/0042505 A1 | 2/2008 | Gerster et al. |
| 2009/0197063 A1 * | 8/2009 | Uchikiba et al. .............. 428/220 |

FOREIGN PATENT DOCUMENTS

| | | |
|---|---|---|
| DE | 1225753 | 7/1965 |
| DE | 1920545 | 11/1969 |
| DE | 1 613 312 A | 10/1970 |
| DE | 24 46 693 B2 | 4/1976 |
| DE | 27 20 531 A1 | 11/1977 |
| DE | 33 33 155 A1 | 3/1985 |
| DE | 44 14 915 A1 | 11/1995 |
| DE | 697 22 044 T2 | 3/2004 |
| DE | 10 2006 017 708 A1 | 10/2007 |
| GB | 1059937 | 2/1967 |
| GB | 1 501 676 | 2/1978 |
| GB | 1 582 433 | 1/1981 |
| JP | 2005-269732 | 9/2005 |
| WO | 95/33622 A1 | 12/1995 |
| WO | 96/22840 A1 | 8/1996 |
| WO | WO 2007/009442 A2 | 1/2007 |

OTHER PUBLICATIONS

Search Report and Written Opinion dated May 30, 2011 for International Patent Application No. PCT/IB2009/051264.

* cited by examiner

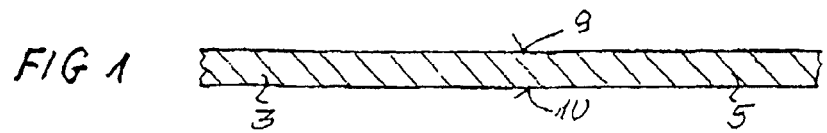
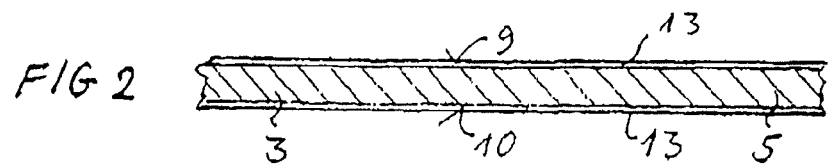
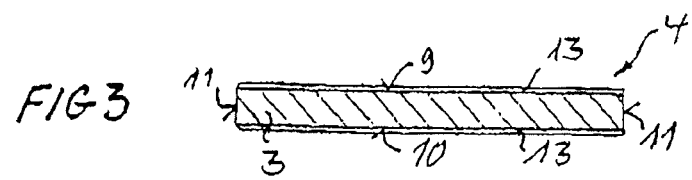
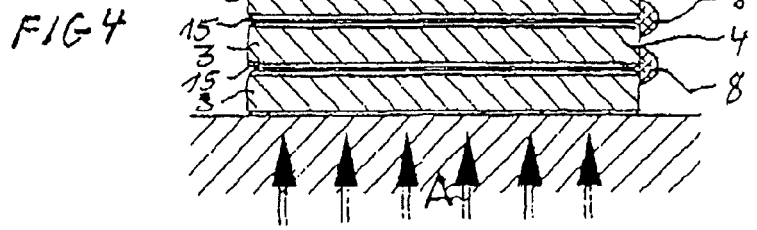
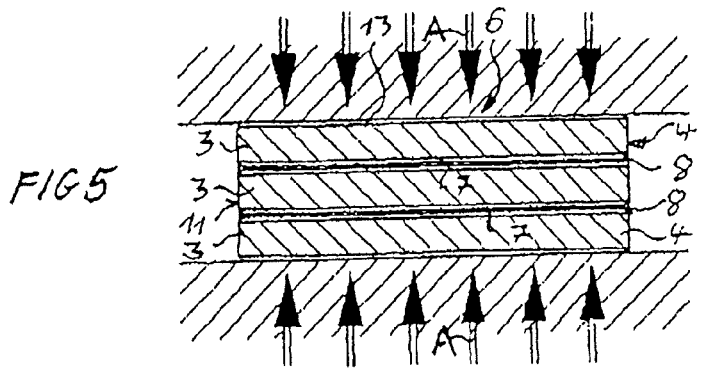
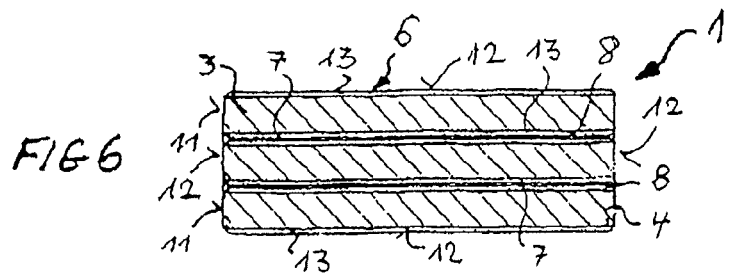

PRIOR ART

METHOD FOR JOINING CORE LAMINATIONS BY ADHESIVE FORCE TO FORM A SOFT-MAGNETIC LAMINATED CORE

BACKGROUND

1. Field

Disclosed herein is a laminated core with soft-magnetic material and a method for joining core laminations by adhesive force to form a soft-magnetic laminated core. The laminated core comprises core laminations which form a core lamination stack. Between the core laminations, the core lamination stack is provided with intermediate layers. These intermediate layers allow the stacked core laminations to be joined by adhesive force to form a laminated core with soft-magnetic material.

2. Description of Related Art

From DE 27 20 531, there is known a method for bonding coated parts, in particular laminated cores of electric motors, by means of an epoxy adhesive, wherein the coated parts are brought into the desired position and then impregnated with the resin using a capillary action, wherein the epoxy adhesive is mixed before the impregnation process with a carrier containing a solvent which reduces the viscosity of the adhesive to a level required for the capillary action. DE 27 20 531 therefore describes the chemistry of the capillary adhesive and solves the problem of changing a viscous, honey-like adhesive in such a way that it becomes thin-bodied and can be used as a capillary adhesive; this is achieved by adding a solvent or a suspension liquid to the adhesive.

As a result of this property, the adhesive shrinks enormously in the drying and curing process, causing strains and negative effects on the magnetic quality of the soft-magnetic laminations. As a result of an associated process-related significant pressure follow-up of the laminated cores, a further degradation of the magnetic quality has to be expected. This has particularly negative effects in a magnetically highly-saturating CoFe laminated core, which invariably has a high magnetostriction, leading to losses in the soft-magnetic properties of the laminated core.

Other conventional methods are known from DE 24 46 693 B2, which relates to the production of electromagnetic components, in particular chokes. To form a stack of bonding laminations, an impregnating resin is used, which results in the problems described below. DE 1 613 312 further discloses a method for bonding magnetic sheets wherein a lacquer is applied to the sheets, which likewise which results in the problems described below.

In these conventional methods for joining core laminations by adhesive force, an adhesive is applied by brushing, spraying or dipping the individual laminations into the adhesive. In these methods, the adhesive consists of solvent-based, diluted adhesive systems. After the solvent has been dried off, the dry, coated laminations are joined to form stacks, whereupon the adhesive is cured. These known methods involve the problem that only relatively thick and uneven adhesive layers can be applied. In capillary processes, known solvent-containing adhesive systems are used, which have the disadvantages described above with respect to magnetic degradation.

FIGS. 7 to 11, for example, illustrate the production of soft-magnetic laminated cores according to prior art. FIG. 7 is a diagrammatic cross-section of a soft-magnetic sheet 5 made of a soft-magnetic material 3 and having a top side 9 and an underside 10. As FIG. 8 shows, the top side 9 and the underside 10 are provided with a coating 13 intended to insulate the core laminations to be stacked from one another electrically. For this purpose, a final annealing of the soft-magnetic sheet 5 may for example be carried out in an inert atmosphere, followed by oxidation annealing in air or a water vapour atmosphere, in order to adjust the soft-magnetic properties of the material on the one hand and to obtain an electrically insulating coating on the other hand. In this final annealing process, a volume increase caused by recrystallisation processes of rolled soft-magnetic sheets is to be observed, this revealing itself in a change in the length and width of the sheet section.

In FIG. 9, the coated soft-magnetic sheets 5 of FIGS. 7 and 8 have been separated in a forming step to form core laminations 4, the contour surfaces 11 now exposing the soft-magnetic material 3. A second annealing process can now be performed, which does however not involve any further volume increase or growth in the length and width of the core laminations 4.

As FIG. 10 shows, an adhesive 8 is then applied to one side or both sides 9 and 10 of the core laminations, and several core laminations 4 coated with the adhesive 8 are then pressed together in the direction of arrow A as shown in FIG. 11. As many core laminations 4 with relatively uneven adhesive layers 8 in between are pressed together to form intermediate layers 7, various regions of the core laminations 4 are warped by warping 16 as shown in FIG. 11, so that stresses are introduced into the soft-magnetic material to the detriment of its soft-magnetic properties.

In addition, the adhesive emerging at the sides of the core laminations 4 in the pressing process has to be removed from the end faces and contour surfaces of the laminated core 2 in complex reworking steps. One disadvantage of such laminated cores 2 from prior art lies in the insufficient parallelism of the bonded core laminations and in the need to rework the laminated core 2. In addition, the relatively thick and undefined adhesive joints which remain between the core laminations have the effect that the fill factor is relatively low and the positive soft-magnetic properties of crystalline CoFe alloys do not show to advantage.

As the core laminations to be joined have to be clamped, as the adhesive is softened and then cured, adhesive escapes in a disadvantageous and relatively undefined way at the circumference or the contour surface of the core. As a result, laminated cores are as a rule produced with insufficient plane parallelism and then have to be brought to scale by mechanical machining both in terms of thickness and as a result of the adhesive leakage at the contour surfaces. These reworking steps can result in short-circuit links between individual core laminations, which in turn lead to eddy current losses in the core. These eddy current losses adversely affect the magnetic properties of these cores.

A further disadvantage of laminated cores joined by adhesive force in this way lies in the fact that the adhesive layer is too thick relative to the thickness of the core laminations, so that the packing density of the core is low. This reduces the soft-magnetic mass relative to the core volume, so that the advantages of a soft-magnetic material, preferably a CoFe alloy, cannot be utilised to the full. In addition, such a laminated core has adhesive layers of varying thickness in the intermediate layers, so that the core laminations have a reduced parallelism from the topmost to the bottom lamination of the laminated core. The required mechanical reworking of the magnet material of the completed laminated core results in magnetic losses, which should be avoided if possible.

SUMMARY

The embodiments herein create a laminated core with soft-magnetic material having significantly reduced strains and as high a magnetic saturation as possible, and of specifying a method for joining core laminations by adhesive force to form a soft-magnetic laminated core, the fill factor of the soft-magnetic material being as high as possible. This is intended to solve the problems affecting prior art as described above and to obtain, in addition to the high fill factor with high magnetic flux through the longitudinal section of the core, the finest mechanical tolerances and an extremely high plane parallelism of the laminated core. It is further intended to minimise the hysteresis losses of the core.

This laminated core is desirably characterised by a BH curve that is as steep as possible, combined with low hysteresis losses. In joining the laminated core by adhesive force, moreover, a high dimensional accuracy and a high shear strength are to be achieved. This laminated core is further desirably characterised by a much reduced need for mechanical reworking after the laminated core has been joined by adhesive force.

Some or all of these problems and others are solved by embodiments of the subject matter disclosed herein.

As disclosed herein, a laminated core with soft-magnetic material and a method for joining core laminations by adhesive force to form a soft-magnetic laminated core are provided. The laminated core comprises core laminations of soft-magnetic sheets which form a core lamination stack. Between the core laminations, the core lamination stack is provided with intermediate layers. The intermediate layers comprise a cured adhesive which is introduced into interstices between the core laminations in a state of low viscosity.

For this purpose, the core laminations in the bonded core comprise a final-annealed CoFe alloy, an adhesive-wettable top side and an adhesive-wettable underside. The core laminations may further comprise a contour surface which is adhesive-wettable to a lesser degree. Together with the intermediate layers, the core laminations form a dimensionally accurate laminated core. The laminated core has a substantially adhesive-free contour made up from contour surfaces of the core laminations. The adhesive is solvent-free in the state of low viscosity.

One advantage of this laminated core is its dimensional accuracy, which in prior art is obtained only by applying a high pressure to the laminated core in the curing and bonding process and by the subsequent grinding of the laminated cores. The high pressure and the grinding of laminated cores in accordance with prior art are detrimental, because the highly magnetic core laminations are subjected to stresses which affect the magnetic values of the soft-magnetic material, for example reducing the µ value. In addition, grinding in order to achieve dimensional stability can result in short-circuit links between the core laminations, in particular because the soft-magnetic material of the core laminations can be clogged in the reworking process, which in turn increases eddy current losses in the laminated core.

With the laminated core according to embodiments disclosed herein, magnetic degradation is reduced significantly already in the production of laminated cores as disclosed herein, owing to the fact that the capillary adhesive does not contain any solvent. The method according to this embodiment is further characterised by the fact that maximum magnetic powers can be achieved by maximum magnetic fill factors which are technically possible, i.e. by laminated cores having minimal bonding gaps. For this purpose, a production process disclosed herein is used which in individual production steps avoids the degradation of the magnetic material by mechanical strains and electric short-circuits as far as is technically possible and which results in maximum obtainable magnetic fill factors.

Compared to the prior art described above, the following difference should be noted as resulting in lower magnetic degradation, i.e. the adhesive system described herein, which is a completely solvent-free and almost shrinkage-free epoxy adhesive system. The absence of solvents results in the following individual advantages:

1. The bonding system used and the adhesive components of the laminated core are entirely solvent-free, and no solvent has to be added either for processing or for application.

2. The absence of solvent in the adhesive used prevents the volume shrinkage associated with the curing of solvent systems as a result of the evaporation of the solvent. This prevents the mechanical straining of individual core laminations of the laminated core described herein which would otherwise be caused by the adhesive in the curing process.

3. The absence of solvent in the adhesive used avoids the formation of blisters in the adhesive between the core laminations, which would result in reduced adhesion and in the escape of significant amounts of adhesive or adhesive froth at the gaps.

4. The absence of solvent in the adhesive used prevents a pressure build-up in the core, because no vapour pressure is generated in the curing process. This likewise avoids mechanical stresses resulting in the degradation of the magnetic material and improves the magnetic properties of the soft-magnetic laminated core described herein.

5. The bonding system used is characterised by minimal shrinkage during the cure of the adhesive components compared to other systems. Owing to the absence of solvent in the adhesive used, any further processing involves a minimum of health and safety and environmental considerations.

6. By using and selecting special adhesive components, the viscosity and the surface tension in the bonding system are adjusted such that optimum capillary forces can form in the gaps of the laminations. The adhesive is introduced by means of capillary processes or other suitable surface coating methods from prior art, such as brushing, spraying, dipping or the like. In the capillary process, the laminated cores are preferably dipped partially into the adhesive, or the adhesive is transferred by means of an intermediate carrier.

7. Owing to the bonding system and/or the method used, the laminated cores can be adjusted to the desired final thickness in the uncured state of the adhesive. In this state, only a low pressure has to be applied, which in turn avoids magnetic degradation. The forces required for adjusting the final thickness can be reduced further by heating the laminated cores, so that the forces are distributed evenly across the laminated core, which once again results in very even bonding gaps across the laminated core.

8. The height of the laminated core according to the invention can be adjusted for dimensional stability using only a low pressure.

9. The core laminations to which the adhesive has been applied require only minimum pressure in the curing process. There is no need for any technically conventional pressure follow-up, in contrast to pre-drying adhesive systems, which in prior art result in strains in the laminated core and thus in the degradation of its magnetic properties.

10. The adhesion and the shear strength as well as the heat resistance of the adhesive system used correspond to prior art for epoxy resin—bonding systems for coated surfaces.

11. The magnetic degradation and the electric short-circuits which are caused by mechanical treatment such as eroding, grinding, milling etc. at the contour of the bonded laminated core can be eliminated by physical/chemical cleaning, for example ultrasonic cleaning combined with a pickling or etching process. In this way, any hysteresis losses increased by the short-circuit links can be reduced drastically.

12. Using this method of adjusting the thickness of the laminated cores, lamination stacks can be produced with technically minimal bonding gaps. These minimal bonding gaps in turn permit the production of laminated cores with technically maximal fill factors of soft-magnetic material and the resulting maximum flux densities in the cross-section of the laminated core.

13. The bonding method is characterised by using only very little in the way of production aids such as adhesives, and by likewise low manufacturing costs. The method is therefore cost-effective and economical in the use of resources.

14. As a result of a low curing temperature of approximately 145° C. of the adhesive used, there are no significant strains in the laminated core in the curing and cooling process. The adhesive is preferably cured in a hot air circulating oven. Any stresses which do occur usually result from technically unavoidable differences between the coefficients of expansion of the adhesive and the coating of the core laminations.

If, in the method for the production of the laminated core according to the invention, a subsequent grinding to measure in order to bring the core contour to scale cannot be avoided, the metallic short-circuit links formed in this process can be eliminated by means of a subsequent chemical cleaning process in order to optimise eddy current losses.

In the laminated core disclosed herein, the core laminations are arranged on top of one another in a non-warped and plane parallel manner with intermediate adhesive layers. This can be achieved by providing that the core laminations are clamped in a suitable bonding device between two plane parallel plates and that a capillary adhesive is applied to a region of the contour of the core laminations layered to form a lamination stack. The top side and the underside of the core laminations are provided with electrically insulating and adhesive-wettable ceramic layers and/or metal oxide layers.

Magnesium oxide or zirconium oxide or aluminium oxide layers are preferably applied to the top side and the underside of the core laminations. The material of the soft-magnetic laminations comprises 45% by weight≤Co≤52% by weight and approximately 45% by weight≤Fe≤52% by weight as well an approximate vanadium component in the range of 0.5% by weight≤V≤2.5% by weight. The vanadium component improves the cold rolling qualities of the material and increases its resistivity.

In a further aspect, it is provided that the core laminations comprise a CoFe alloy made of iron with 35.0% by weight≤Co≤55.0% by weight, preferably 45.0% by weight≤Co≤52.0% by weight, 0% by weight≤Ni≤0.5% by weight and 0.5% by weight≤V≤2.5% by weight plus any melting-related and/or accidental impurities is used.

In a further embodiment, it is provided that a CoFe alloy made of iron with 35.0% by weight≤Co≤55.0% by weight, 0.75% by weight≤V≤2.5% by weight, 0% by weight (Ta+2×Nb) 1.0% by weight, 0% by weight≤Zr≤1.5% by weight, 0% by weight≤Ni≤5.0% by weight plus any melting-related and/or accidental impurities is used.

In a further embodiment, it is provided that a CoFe alloy made of iron with 35.0% by weight≤Co≤55.0% by weight, 0% by weight≤V≤2.5% by weight, 0% by weight (Ta+2×Nb) 1.0% by weight, 0% by weight≤Zr≤1.5% by weight, 0% by weight≤Ni≤5.0% by weight, 0% by weight≤C≤0.5% by weight, 0% by weight≤Cr≤1.0% by weight, 0% by weight≤Mn≤1.0% by weight, 0% by weight≤Si≤1.0% by weight, 0% by weight≤Al≤1.0% by weight and 0% by weight≤B≤0.01% by weight plus any melting-related and/or accidental impurities is used.

In a further embodiment, it is provided that a CoFe alloy made of iron with 48.0% by weight≤Co≤50.0% by weight, 0% by weight≤V≤2.5% by weight, 0% by weight (Ta+2×Nb) 1.0% by weight, 0% by weight≤Zr≤1.5% by weight, 0% by weight≤Ni≤5.0% by weight, 0% by weight≤C≤0.5% by weight, 0% by weight≤Cr≤1.0% by weight, 0% by weight≤Mn≤1.0% by weight, 0% by weight≤Si≤1.0% by weight, 0% by weight≤Al≤1.0% by weight and 0% by weight≤B≤0.01% by weight, plus any melting-related and/or accidental impurities is used.

A further composition of a cobalt/iron/vanadium alloy has, in addition to the iron contents listed above, a cobalt content of 48.0% by weight≤Co≤50.0% by weight, a vanadium content of 1.8% by weight≤V≤2.2% by weight, a nickel content of 0% by weight≤Ni≤0.5% by weight and a chromium content of 0% by weight≤Cr≤10.1% by weight. In addition to vanadium, this alloy also contains niobium with a niobium content of 0.1% by weight≤Nb≤0.5% by weight. The magnesium and silicon content should in each case not exceed 0.1% by weight. The alloy further contains nitrogen and oxygen, with 0% by weight≤O≤0.006% by weight and 0% by weight≤N≤0.004% by weight. Melting-related and/or accidental impurities may also be present.

A further possible iron-based composition has a cobalt content of 15% by weight≤Co≤35% by weight and a content of 1% by weight≤X≤6.5% by weight, X being one or more of the elements Cr, Mo, V, Mn and Al.

Such alloys are known under the brand names VACOFLUX 50, VACOFLUX 48, VACOFLUX 17, VACODUR 50 or VACODUR S Plus; further CoFe alloys have the names Rotelloy, Hiperco, Permendur or AFK.

Such soft-magnetic CoFe laminations are preferably made available in a thickness d of 50 μm≤dm≤500 μm and particularly preferred of 50 μm≤d≤350 μm, the width of core laminations made of these soft-magnetic materials being typically 5 mm≤b≤300 mm.

The good wettability of the top sides and undersides of the core laminations permits the use of a solvent-free capillary adhesive which fills the interstices between core laminations which are pressed on top of one another. As a result of the absence of solvent in the capillary adhesive, the disadvantages of prior art are overcome, because no solvents have to be removed from the interstices, which could otherwise result in gas bubbles or voids in the thin capillary adhesive layer. The good wettability of the coatings on the top side and the underside of the core laminations further promotes an even spread of the solvent-free, epoxy-based capillary adhesive in the fine interstices between the stacked core laminations in a bonding device. The adhesive is introduced into the laminated cores by means of capillary processes or other suitable surface coating methods from prior art.

The intermediate layers are preferably based on a solvent-free capillary adhesive which comprises an A component represented by a medium- to high-viscosity epoxy resin of the Biphenol-A or Biphenol-F type, a further B component represented by a low-molecular and low-viscosity epoxy resin compound and at least one additional C component represented by a liquid, low-viscosity curing component.

The A component of a medium- to high-viscosity epoxy resin of the Biphenol-A or Biphenol-F type or a mixture thereof has a viscosity vA of 500≤vA≤30 000 mPas, an epoxy equivalent weight GA of 0.2≤GA≤0.6 mol epoxy/100 g of the A component and a mass component mA of total resin of 1%≤mA≤25%.

The B component of the capillary adhesive has a viscosity $vB \leq 100$ mPas, an epoxy equivalent weight GB of $0.5 \leq GB \leq 1.2$ mol epoxy/100 g of the B component and a mass component mB of total resin of $20\% \leq mB \leq 50\%$. This B component may preferably comprise a compound from the group which includes ethylene glycol diglycidyl ether, propylene glycol diglycidyl ether and butanediol diglycidyl ether.

As a liquid, low-viscosity curing component of the anhydride type, the C component has a viscosity vC of $vC<100$ mPas and a mass component mC of total resin of $30\% \leq mC \leq 70\%$. Such a C component may be a methyl cyclohexane dicarboxylic acid anhydride. In addition to the A, B and C components, a D component of the amine, imidazole or metal salt complex type with a mass component mD of total resin of $0.01\% \leq mD \leq 2\%$ may be provided to act as a cure accelerator.

As a D component, the capillary adhesive may comprise a compound from the group which includes dimethyl benzylamine, diaza bicyclononane and ethyl methyl imidazole. The capillary adhesive preferably comprises at least one additive from the group which includes adhesion promoters, flexibility promoters, dyes, reactive thinners and wetting agents. The adhesive is therefore capable of joining the core laminations with a high shear strength. Core laminations bonded in this way preferably have an adhesive tensile shear strength of 18 MPa or more.

A method for joining core laminations by adhesive force to form a soft-magnetic laminated core comprises the following process steps. First, sheets having top sides and undersides are produced from a soft-magnetic, crystalline CoFe material. A coating which can be wetted with epoxy resin is then applied to the top sides and undersides. From these coated, soft-magnetic sheets are separated core laminations having a wettable coating on their top sides and undersides and less wettable contour surfaces. Final annealing may be carried out before, after or even simultaneous with the coating process. For example, application of the coating wettable with epoxy resin can be done during a soft-magnetic final annealing process.

The final annealing mentioned above may already be carried out before the core laminations having a wettable coating on their top sides and undersides and less wettable contour surfaces are separated out from the sheets. In the final annealing process, which may be carried out at a temperature TG of 700° C. TG 900° C. for 2 to 10 hours, the dislocation density of the alloy is reduced, stresses are relieved and a coarse-grained structure is obtained, which ensures good soft-magnetic properties.

As final annealing involves a growth or increase of the volume of the soft-magnetic sheets and/or core laminations, this method for joining core laminations by adhesive force to form a soft-magnetic laminated core specifies that the soft-magnetic final annealing process is carried out at least prior to the bonding of the core lamination stacks. The shaping to end measure is then carried out on the bonded core, preferably by means of erosion or grinding, or by means of such methods as milling, grinding or turning.

The separated-out core laminations are then stacked to form a core lamination stack in a suitable stacking or bonding mould. In this process, the core laminations are fixed to a degree which only allows for the formation of small interstices in the lower micron range. This method allows in an advantageous way a thickness adjustment of the cores, which provides stacks with technically minimal bonding gaps. These minimal bonding gaps in turn allow the production of cores with maximum fill factors which are technically possible and resulting maximum flux densities in the cross-section of the laminated core.

The core lamination stack is joined by adhesive force to form a soft-magnetic laminated core of standard final dimensions by being penetrated in a capillary fashion by a solvent-free, low-viscosity, epoxy-based capillary adhesive, which is then cured to form an intermediate layer.

Owing to a low curing temperature of the adhesive used, i.e. approximately 145° C., no significant strains are generated in the laminated core in the curing and cooling process. Such strains are usually due to technically unavoidable differences between the coefficients of expansion of the adhesive and of the wettable surface coating. The cure is preferably performed in an apparatus such as a hot air circulating oven.

This method has the advantage that, by using the solvent-free, low-viscosity capillary adhesive, the packing density of the core lamination stack and therefore of the soft-magnetic material can be increased significantly in comparison to soft-magnetic laminated cores of prior art. As a result of the high fill factor, a high magnetic flux can be obtained across the longitudinal section of the core. High induction values at given H values are possible, resulting in a steep BH curve. At the same time, hysteresis losses are minimised.

By using the low-viscosity and solvent-free capillary adhesive, a high dimensional accuracy can be obtained for the contour of the soft-magnetic laminated core as well. In contrast to painting, spray or dip coating, no adhesive is squeezed out of the interstices, but the core laminations are, prior to the introduction of the capillary adhesive, located on top of one another in the bonding mould in a plane parallel arrangement until a high parallelism is achieved from the lowermost core lamination to the uppermost core lamination. Only then is the capillary adhesive offered from an end face of the core lamination stack in order to fill the interstices in the micron range. The capillary adhesive further ensures a high shear strength as a result of a good adhesion of the core laminates to one another. After the bonding process, there is very little, if any, need for mechanical treatment.

The bonding method involves little use of production aids such as adhesive and a likewise low manufacturing effort and expenditure. The method can therefore be considered to be cost-effective and economical in the use of resources, resulting in rational cost-effective manufacture using the method described herein. In addition, the method is environmentally friendly, involving only solvent-free process steps.

If a mechanical reworking of the laminated core is required as mentioned above, a chemical cleaning process can be used to advantage in order to remove any short-circuit links which may be established between the core laminations of the laminated core in the reworking process.

In a preferred embodiment of the method, a final annealing of the coated soft-magnetic material is carried out after the application of the epoxy-wettable coating of the soft-magnetic sheets or the soft-magnetic strip.

After this final annealing, an additional oxidation annealing process can be carried out in air or in a water vapour atmosphere, which makes the surface of the soft-magnetic sheets even more easily wettable by epoxy resin. There are therefore several variants for the use of the final annealing process.

This results in a preferred variant of the method, wherein a soft-magnetic CoFe strip, which may already have an epoxy-wettable coating, is slit into narrower strips which are then subjected to a magnetic final annealing process, possibly followed by oxidation annealing to form improved wettable top sides and undersides of the sheet-metal strips.

Only then are the soft-magnetic CoFe sheet-metal strips processed into core laminations, so that the less wettable, soft-magnetic material at the contour surfaces is exposed. The laminations can then be stacked and bonded using a capillary adhesive to form a laminated core without requiring any significant reworking, because the laminated core may already have its final dimensions. If reworking, for example by grinding, is nevertheless required, subsequent chemical cleaning will ensure that any short-circuit links established between the core laminations in the reworking process are removed.

In a further variant, a soft-magnetic CoFe strip of this type, which may already have an epoxy-wettable coating, can be slit into narrower strips, followed by magnetic final annealing. After the final-annealed strip has been processed into core laminations, any magnetic degradation can be eliminated in a second annealing process with or without simultaneous or subsequent oxidation. In this second annealing process, there is no further growth or volume increase, so that the dimensional stability of the core laminations is maintained by the previous forming of the material which has already been final-annealed in its strip form.

The second final annealing process may either be analogous to the first or carried out in dependence on the soft-magnetic material used in order to optimise its magnetic properties. The core laminations can then be stacked and bonded with a capillary adhesive without altering the dimensions of the laminated core.

By means of the second annealing process after forming, any magnetic degradation caused by the forming process after the first final annealing can be eliminated, and the core laminations can be set to a high mechanical accuracy, because the second annealing process does not involve any volume change in the core laminations.

In a further variant of the method, the already final-annealed soft-magnetic sheets, which are provided with a magnesium oxide and/or other metal oxide layer possibly optimised by oxidation annealing in air or in a water vapour atmosphere as an electrically insulating and wetting promoting layer, can be stacked and bonded with a capillary adhesive. Only then may a laminated core be formed by erosion, followed by a useful physical and/or chemical cleaning process of the contour surfaces of the laminated core in order to eliminate the short-circuit links which may have formed between individual core laminations of the laminated core in the erosion process. Any short-circuit links which may have formed as a result of necessary mechanical reworking steps, such a the grinding of the contours, are removed as well.

In place of pure oxide layers, which may for example be applied by annealing in air or water vapour, it is also possible to deposit on the soft-magnetic sheets electrically insulating and adhesive-wettable ceramic layers without producing tailor-made magnesium oxide layers, zirconium oxide layers or aluminium oxide layers, for example from a plasma in a plasma depositing oven. The individual core laminations can be separated out from the coated soft-magnetic sheets by stamping, spark erosion, water jet cutting, etching or laser cutting.

In a suitable bonding device, the core laminations can be stacked and located in a non-warped and plane parallel manner, and from an end face of the core lamination stack, an epoxy-based adhesive can fill the interstices between the core laminations of the core lamination stack without wetting the other contour surfaces of the core laminations.

Before final annealing, the soft-magnetic sheets can be cold-rolled to a thickness d of d≤1000 µm, preferably to 50 µm≤d≤500 µm. In this context, the method specified above offers the advantage that extremely thin core laminations, even in the range of 50 µm, can be bonded to one another in a non-warped and plane parallel manner. The soft-magnetic final annealing of a CoFeV alloy in an inert gas atmosphere can be carried out at a temperature TG of 700° C. TG 900° C. for less than 10 hours.

In the final annealing process, several soft-magnetic sheets can be pressed simultaneously between two steel plates acting as annealing plates. The steel plates may for example have an area of at least 290×290 mm².

The solvent-free, low-viscosity capillary adhesive used is preferable an adhesive comprising at least three components, i.e. a base component A with a relatively high viscosity, B and C components having a lower viscosity and preferably a D component acting as a cure accelerator.

The A component is a medium- to high-viscosity epoxy resin of the Biphenol-A or Biphenol-F type or mixtures thereof, with a viscosity vA of 500≤vA≤30 000 mPas, and an epoxy equivalent weight GA for the A component of 0.2≤GA≤0.6 mol epoxy/100 g of the A component and a mass component mA of total resin of the A component between 1%≤mA≤25%.

The B component is a low-molecular and low-viscosity epoxy resin compound with at least two epoxy resin groups per molecule. This epoxy resin compound is formed by converting an aliphatic diol with epichlorohydrine. As B component of the capillary adhesive, a material having a viscosity vB of vB≤100 mPas, an epoxy equivalent weight GB of 0.5≤GB≤1.2 mol epoxy/100 g of the B component and a mass component mB of total resin of 20%≤mB≤50% is provided.

The B component can be selected from the group which includes ethylene glycol diglycidyl ether, propylene glycol diglycidyl ether and butanediol diglycidyl ether.

The C component used is a liquid, low-viscosity curing component of the anhydride type, with a viscosity vC of vC<100 mPas and a mass component mC of total resin of 30%≤mC≤70%.

Such a C component may be a methyl cyclohexane dicarboxylic acid anhydride. In the method for the production of soft-magnetic laminated cores joined by adhesive force, it is further possible to provide a D component of the amine, imidazole or metal salt complex type with a mass component mD of total resin of 0.01%≤mD≤2% to act as a cure accelerator. As such a D component, a compound from the group which includes dimethyl benzylamine, diaza bicyclononane and ethyl methyl imidazole can be used. It is further possible to add to the capillary adhesive additives from the group which includes adhesion promoters, flexibility promoters, dyes, reactive thinners and wetting agents.

BRIEF DESCRIPTION OF DRAWINGS

The embodiments disclosed herein are explained in greater detail below with reference to the accompanying figures.

FIGS. 1 to 6 are schematic diagrams relating to joining core laminations by adhesive force, starting with soft-magnetic sheets or strip material.

FIG. 1 is a diagrammatic cross-section through a part of a soft-magnetic sheet or strip made of a soft-magnetic material;

FIG. 2 shows the part according to FIG. 1 following the application of a wettable layer to the soft-magnetic sheet or strip;

FIG. 3 is a diagrammatic cross-section through a core lamination produced by separating out or shaping the soft-magnetic sheet or strip;

FIG. 4 is a diagrammatic cross-section through a core lamination stack with a store of capillary adhesive applied to an end face of the core lamination stack;

FIG. 5 is a diagrammatic cross-section through the core lamination stack from FIG. 4 after the interstices of the core laminations have been filled with a low-viscosity, solvent-free capillary adhesive;

FIG. 6 is a diagrammatic cross-section through the core lamination stack after the capillary adhesive has been cured to form intermediate layers of a soft-magnetic laminated core;

DETAILED DESCRIPTION OF SPECIFIC EMBODIMENTS

Figure 7:
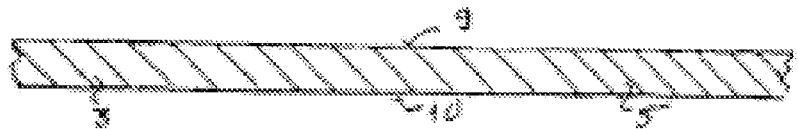
FIGS. 7 to 11 show the production of soft-magnetic laminated cores in accordance with prior art as described above.
Figure 8:
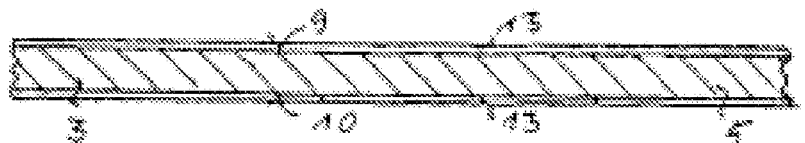
Figure 9:
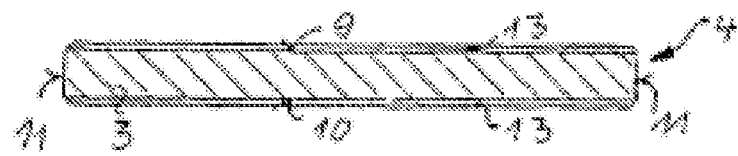
Figure 10:
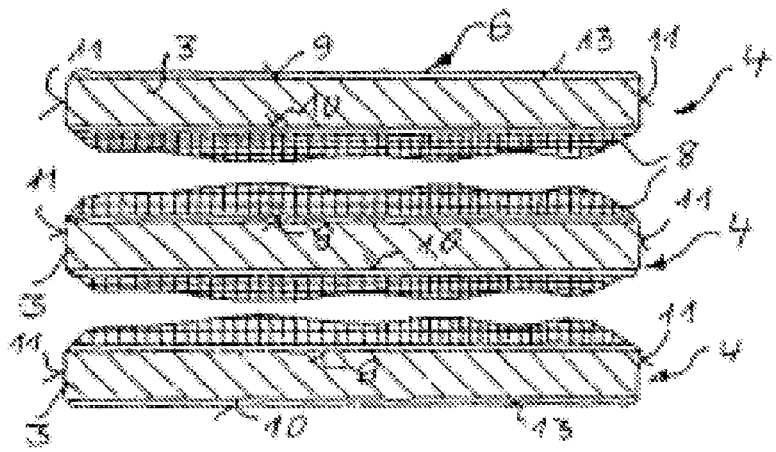
Figure 11:
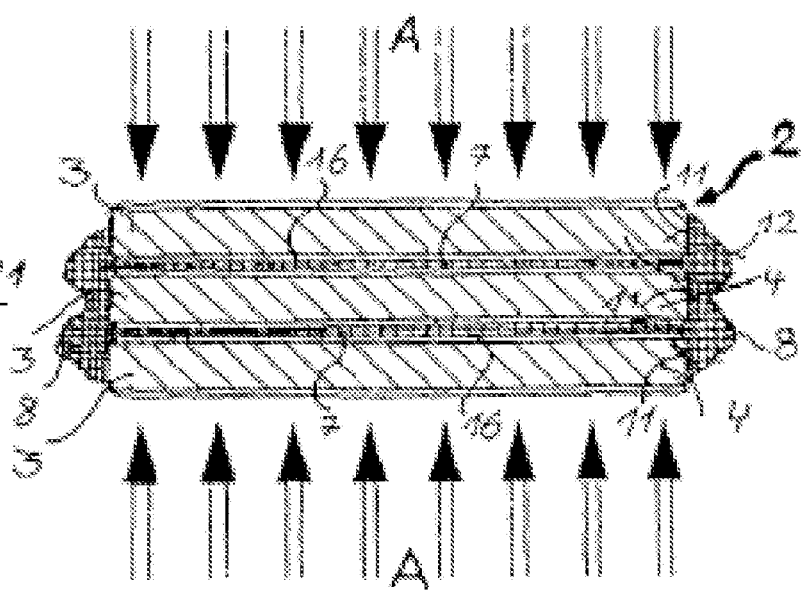

FIG. 1 is a diagrammatic cross-section through a part of a soft-magnetic sheet 5 made of a soft-magnetic material 3, which essentially is a CoFe alloy and consists of iron with 35.0% by weight≤Co≤55.0% by weight, 0% by weight≤V≤2.5% by weight, 0% by weight (Ta+2×Nb) 1.0% by weight, 0.3% by weight≤Zr≤1.5% by weight, 0% by weight≤Ni≤5.0% by weight, 0% by weight≤C≤0.5% by weight, 0% by weight≤Cr≤1.0% by weight, 0% by weight≤Mn≤1.0% by weight, 0% by weight≤Si≤1.0% by weight, 0% by weight≤Al≤1.0% by weight and 0% by weight≤B≤0.01% by weight plus any melting-related and/or accidental impurities. Such soft-magnetic CoFe sheets are preferably produced with a thickness d of 50 μm≤d≤500 μm, the width of the core laminations produced from these soft-magnetic sheets being 5 mm≤b≤300 mm.

In addition, the top side 9 and the underside 10 have to be provided with an insulating layer in order to insulate individual core laminations which are to be produced from these soft-magnetic sheets from one another electrically. The insulation may be based on ceramic and/or oxide layers, wherein the oxide layers may be formed during the hermetic final annealing process of these soft-magnetic sheets 5, for example immediately following the final annealing, by further annealing in air or in a water vapour atmosphere.

As FIG. 2 shows, this results in a sheet 5 according to FIG. 1 provided with an electrically insulating layer and a top side 9 and an underside 10 wettable by an epoxy adhesive. The soft-magnetic sheet can then be separated into individual core laminations as shown in FIG. 3, the core laminations having a thickness d of 50 μm≤d≤500 μm and preferably of 50 μm≤d≤350 μm. The electrically insulating and wettable coatings 13 on the top side 9 and the underside 10 have a film thickness of a few 10 nanometers to a few microns. In the illustrated embodiment, these coatings do not cover contour surface 11.

FIG. 4 is a diagrammatic cross-section through a core lamination stack with a store of capillary adhesive applied to an end face of the core lamination stack. Symbolically, the core lamination stack 6 of this figure comprises only three core laminations. In reality, such a core lamination stack consists of a plurality of core laminations 4 of a soft-magnetic material 3, separated, e.g., by intermediate layers 7, which are located in the direction of arrow A by means of suitable devices and are oriented without warping.

In interstices 15 between the core laminations 4, the capillary adhesive 8 can penetrate from the beads along the gaps between the core laminations 4 into the interstices 15 in a capillary manner at room temperature or with relatively little heating of the core lamination stack.

FIG. 5 is a corresponding cross-section through the core lamination stack from FIG. 4 after the interstices 15 of the core laminations 4 have been filled with a low-viscosity, solvent-free adhesive. The capillary adhesive store shown in FIG. 4 on the end face 14 is completely used up and completely fills the interstice 15 shown in FIG. 4. By means of a bonding device, which also causes a plane parallel location of the top side and the underside of the core lamination stack, a dimensionally accurate, soft-magnetic laminated core as shown in FIG. 6 can be produced with a high fill factor.

In contrast to methods which do not use capillary adhesives, the soft-magnetic laminated core produced in this way offers the advantage that the core laminations remain precisely parallel and are not warped; there is no need for any reworking in order to remove overhanging adhesive.

While the final annealing of soft-magnetic sheets involves a volume growth caused by the re-crystallisation of the CoFe alloy, further annealing can be carried out after the final-annealed soft-magnetic sheets have been split into core laminations 4 as shown in FIG. 3 and formed without causing any volume growth; the shape of the sheet is therefore not changed, but any magnetic degradation caused by the forming process is eliminated, and the final geometric dimensions of the core laminations are maintained. If the sheets have previously received a metal oxide coating based on iron, cobalt or vanadium oxide by means of annealing in air or in a water vapour atmosphere, however, the final annealing process for the core laminations has to include such a re-annealing treatment in a vacuum or a reducing atmosphere, for example in an inert gas atmosphere, so that the metal oxide layer is not reduced. In order to avoid this, the oxide layer based on iron, cobalt or vanadium oxide is typically only applied after the second annealing process in the manner described above, i.e. by means of heat treatment in air or in a water vapour atmosphere. If the coatings are based on MgO, $ZrO_2$ or $Al_2O_3$, annealing is possible in a conventional water vapour atmosphere, because these coatings are not reduced at commonly used annealing temperatures.

Figure 12:
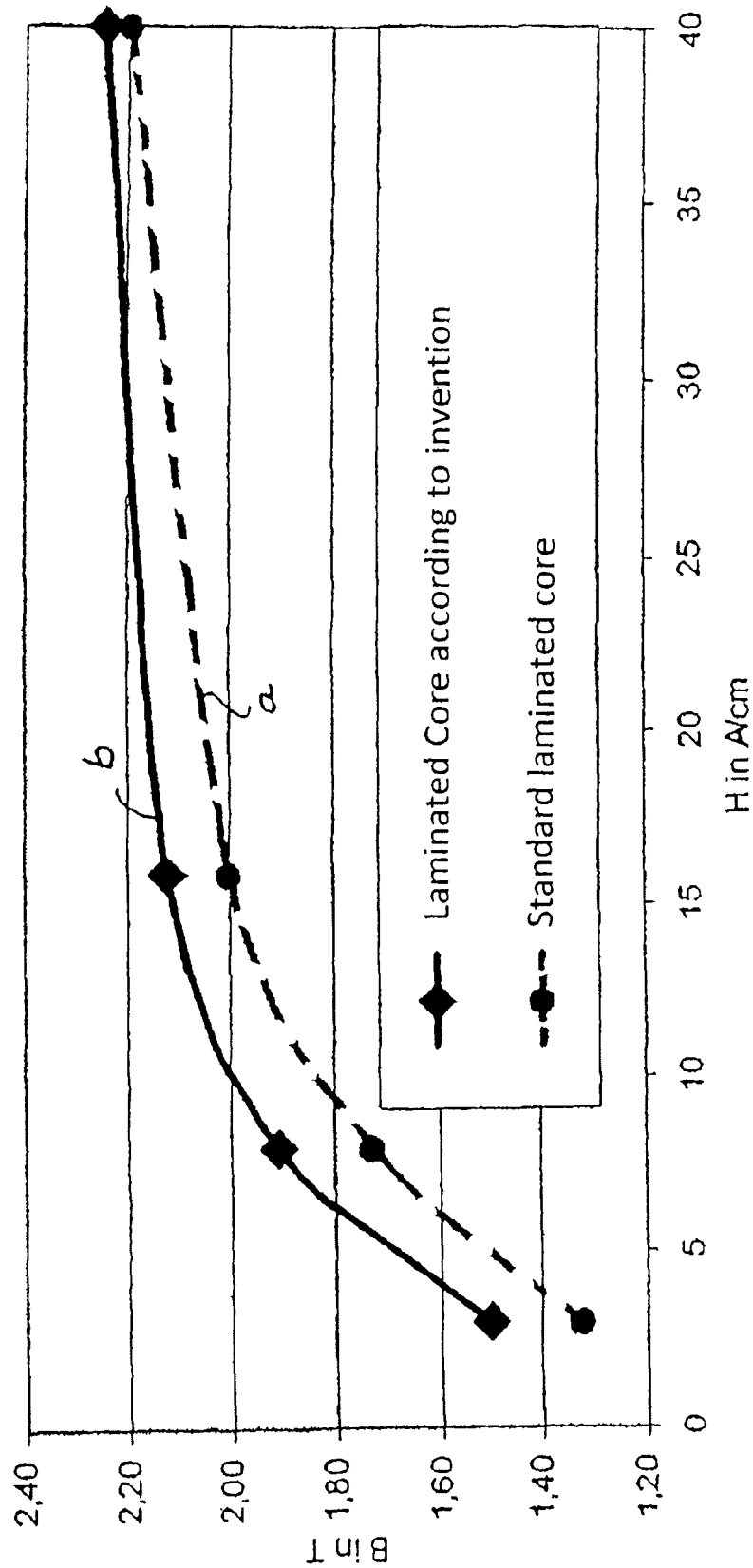
FIG. 12 is a diagram of B(H) values of two laminated cores of a soft-magnetic CoFe material produced using different adhesive systems.

FIG. 12 is a diagram of B(H) values of two laminated cores of a soft-magnetic CoFe material produced using different adhesive systems. The magnetic field strength H in A/cm is plotted on the abscissa, while the magnetic flux B in Tesla (T) is plotted on the ordinate. The broken line a indicates the B(H) values of a standard laminated core with standard bonding, and these values are noticeably lower than those of the continuous line b for a laminated core according to the invention.

Figure 13:
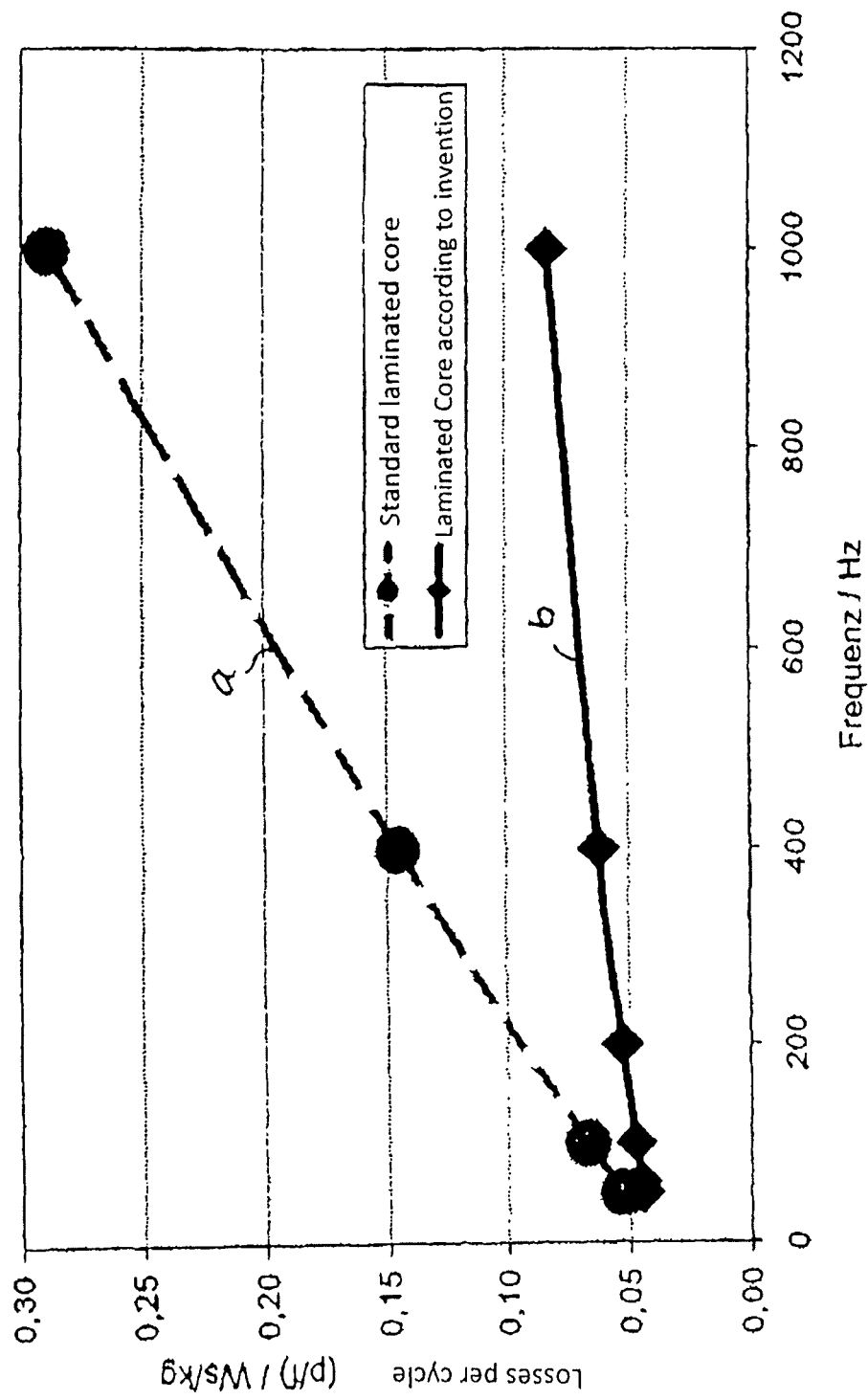
FIG. 13 is a diagram of losses in two annular laminated cores of a soft-magnetic CoFe material which have been bonded using different methods.

FIG. 13 is a diagram of losses in two annular laminated cores of a soft-magnetic CoFe material which have been bonded using different methods. The cycle count is plotted on the abscissa as frequency in Hz, and the losses per cycle in Ws/kg are plotted on the ordinate. The broken line a indicates the losses of a standard laminated core with standard bonding, and these values are noticeably higher than those of the continuous line b for a laminated core according to the invention.

Figure 14:
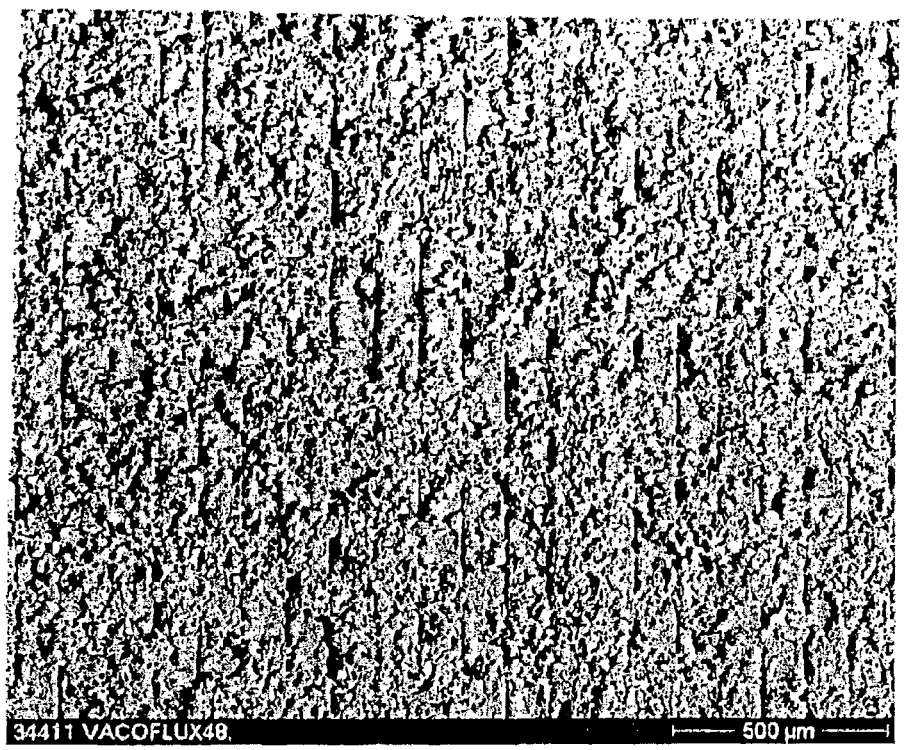
FIGS. 14 and 15 are SEM photomicrographs of an eroded area of a core with individual lamination edges having electric contact as a result of short-circuit links.
Figure 15:
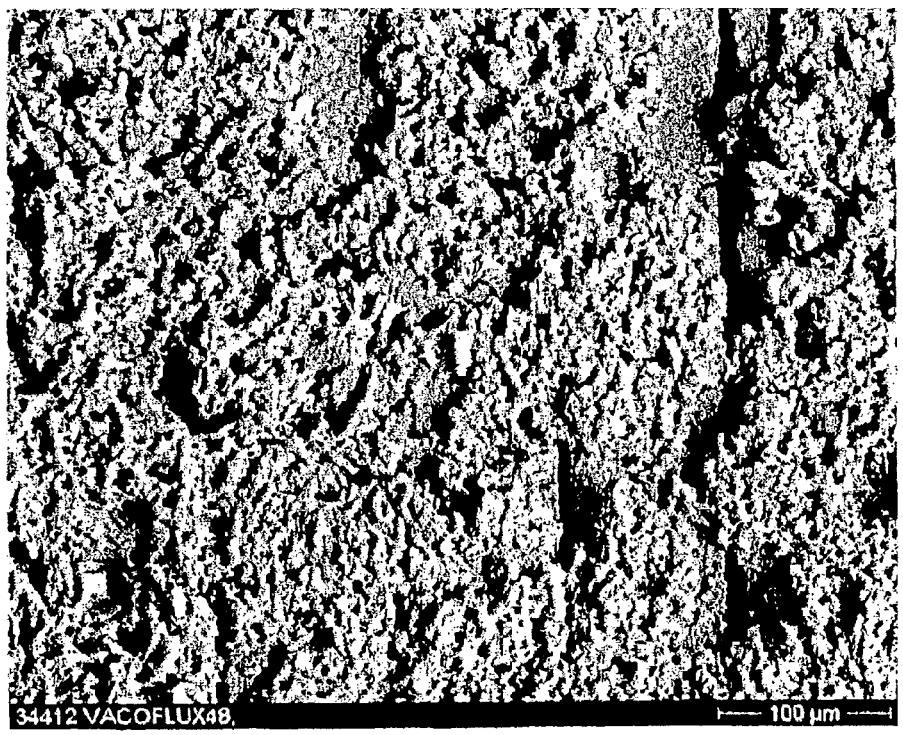

FIGS. 14 and 15 are scanning electron microscope pictures of an eroded area of a core made of individual laminations in different resolutions. The individual laminations are visibly connected to one another electrically via their edges. These short-circuit links increase the hysteresis losses of the finished core.

Figure 16:
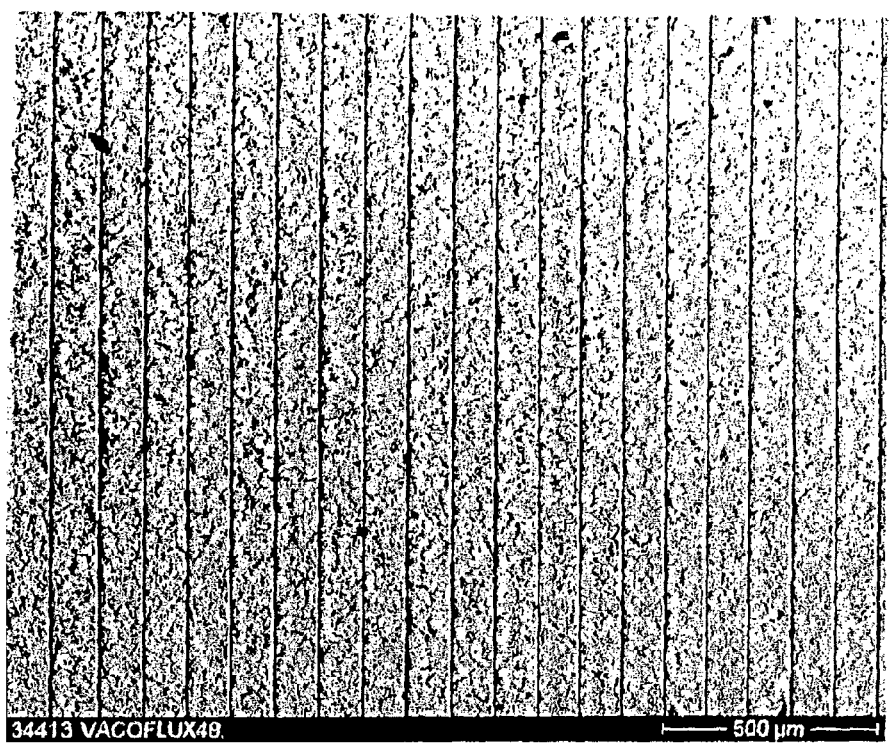
FIGS. 16 and 17 are SEM photomicrographs of an eroded area of a core with individual lamination edges which have been electrically separated by a cleaning process.
Figure 17:
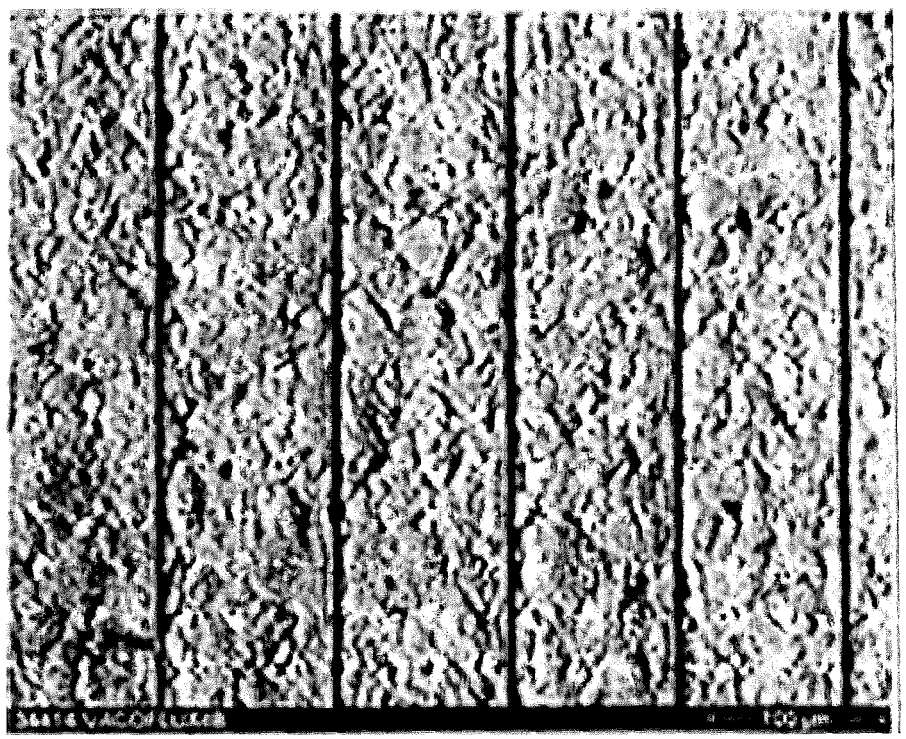

FIGS. 16 and 17 are scanning electron microscope pictures of the area shown in FIGS. 14 and 15 in different resolutions. The short-circuit links between the cut individual laminations have been eliminated by a chemical cleaning process described in greater detail above.

The invention has been described with reference to certain specific embodiments and examples, which are intended to illustrate the invention without limiting the scope of the appended claims.

The invention claimed is:

1. A method for joining core laminations to form a soft-magnetic laminated core, comprising:
producing sheets of a soft-magnetic, crystalline CoFe material, each sheet having a top side and an underside;
applying a coating that is wettable with epoxy resin to the top sides and undersides of each sheet;
separating said sheets into core laminations having a wettable coating on the top sides and undersides and having less wettable contour surfaces;
stacking the core laminations to form a core lamination stack, comprising stacking each core lamination on top of another core lamination without warping and in a plane parallel manner, and wherein said introducing of said solvent-free, low-viscosity adhesive between the core laminations comprises filling an epoxy-based solvent-free adhesive of low viscosity into the interstices between the core laminations of the core lamination stack from an end face of the core lamination stack by means of capillary action; and
joining the core lamination stack by adhesive force to produce a soft-magnetic laminated core by introducing a solvent-free, low-viscosity adhesive between the core laminations in the core lamination stack, and curing the adhesive to produce electrically insulating intermediate layers between sheets of soft-magnetic material.

2. The method according to claim 1 wherein the laminated soft magnetic core comprises a core lamination stack comprising:
a plurality of core laminations each comprising a soft-magnetic sheet having one or more contour surfaces, and
one or more intermediate layers comprising a cured adhesive introduced as an uncured adhesive between the soft-magnetic sheets while in a state of low viscosity and in a solvent-free state, and
wherein the core laminations comprise a final-annealed, crystalline CoFe alloy having an adhesive-wettable top side and an adhesive-wettable underside, and
wherein the core laminations combined with the intermediate layers form a dimensionally accurate laminated core having a substantially adhesive-free contour formed at least in part from a plurality of contour surfaces of the core laminations.

3. The method according to claim 2, wherein the plurality of core laminations and the one or more intermediate layers are arranged on top of one another in a non-warped and plane parallel manner.

4. The method according to claim 2, wherein the adhesive-wettable top side and the adhesive-wettable underside of one or more of the core lamination comprise electrically insulating and adhesive-wettable ceramic layers.

5. The method according to claim 2, wherein the adhesive-wettable top side and the adhesive-wettable underside of one or more of the core lamination comprise magnesium oxide layers.

6. The method according to claim 2, wherein the adhesive-wettable top side and the adhesive-wettable underside of one or more of the core laminations comprise zirconium oxide layers.

7. The method according to claim 2, wherein the adhesive-wettable top side and the adhesive-wettable underside of the one or more core laminations comprise aluminium oxide layers.

8. The method according to claim 2, wherein the adhesive-wettable top side and the adhesive-wettable underside of the one or more core laminations comprise iron, cobalt and/or vanadium oxide layers.

9. The method according to claim 2, wherein the soft-magnetic sheets have a rolled texture prior to being final annealed.

10. The method according to claim 2, wherein the core laminations comprise a CoFe alloy containing iron, $35.0\%$ by weight$\leq$Co$\leq 55.0\%$ by weight, $0\%$ by weight$\leq$Ni$\leq 0.5\%$ by weight, and $0.5\%$ by weight$\leq$V$\leq 2.5\%$ by weight, plus any melting-related and/or accidental impurities.

11. The method according to claim 10, wherein $45.0\%$ by weight$\leq$Co$\leq 52.0\%$ by weight.

12. The method according to claim 2, wherein the core laminations comprise a CoFe alloy containing iron, $35.0\%$ by weight$\leq$Co$\leq 55.0\%$ by weight, $0.75\%$ by weight$\leq$V$\leq 2.5\%$ by weight, $0\%$ by weight$\leq$(Ta+2$\times$Nb)$\leq 1.0\%$ by weight, $0\%$ by weight$\leq$Zr$\leq 1.5\%$ by weight, $0\%$ by weight$\leq$Ni$\leq 5.0\%$ by weight, plus any melting-related and/or accidental impurities.

13. The method according to claim 2, wherein the core laminations comprise a CoFe alloy containing iron, $35.0\%$ by weight$\leq$Co$\leq 55.0\%$ by weight, $0\%$ by weight$\leq$V$\leq 2.5\%$ by weight, $0\%$ by weight (Ta+2$\times$Nb)$\leq 1.0\%$ by weight, $0\%$ by weight$\leq$Zr$\leq 1.5\%$ by weight, $0\%$ by weight$\leq$Ni$\leq 5.0\%$ by weight, $0\%$ by weight$\leq$C$\leq 0.5\%$ by weight, $0\%$ by weight$\leq$Cr$\leq 1.0\%$ by weight, $0\%$ by weight$\leq$Mn$\leq 1.0\%$ by weight, $0\%$ by weight$\leq$Si$\leq 1.0\%$ by weight, $0\%$ by weight$\leq$Al$\leq 1.0\%$ by weight and $0\%$ by weight$\leq$B$\leq 0.01\%$ by weight, plus any melting-related and/or accidental impurities.

14. The method according to claim 2, wherein the core laminations comprise a CoFe alloy containing iron, $48.0\%$ by weight$\leq$Co$\leq 50.0\%$ by weight, $0\%$ by weight$\leq$V$\leq 2.5\%$ by weight, $0\%$ by weight (Ta+2$\times$Nb)$\leq 1.0\%$ by weight, $0\%$ by weight$\leq$Zr$\leq 1.5\%$ by weight, $0\%$ by weight$\leq$Ni$\leq 5.0\%$ by weight, $0\%$ by weight$\leq$C$\leq 0.5\%$ by weight, $0\%$ by weight$\leq$Cr$\leq 1.0\%$ by weight, $0\%$ by weight$\leq$Mn$\leq 1.0\%$ by weight, $0\%$ by weight$\leq$Si$\leq 1.0\%$ by weight, $0\%$ by weight$\leq$Al$\leq 1.0\%$ by weight and $0\%$ by weight$\leq$B$\leq 0.01\%$ by weight, plus any melting-related and/or accidental impurities.

15. The method according to claim 2, wherein the core laminations comprise a CoFe alloy containing iron, $15\%$ by weight$\leq$Co$\leq 35\%$ by weight and $1\%$ by weight$\leq$X$\leq 6.5\%$ by weight, X being one or more of the elements Cr, Mo, V, Mn and Al, plus any melting-related and/or accidental impurities.

16. The method according to claim 2, wherein the core laminations have a thickness d in micron of $50\ \mu m\leq d\leq 500\ \mu m$, and a width b of $5\ mm\leq b\leq 300\ mm$.

17. The method according to claim 16, wherein $50\ \mu m\leq d\leq 350\ \mu m$.

18. The method according to claim 2, wherein the one or more intermediate layers is a solvent-free capillary adhesive.

19. The method according to claim 18, wherein the one or more intermediate layers comprise an organic, physically binding, solvent-free and epoxy-based capillary adhesive.

20. The method according to claim 2, wherein the one or more intermediate layers comprise a solvent-free capillary adhesive formed by curing an A component comprising a medium- to high-viscosity epoxy resin of the Biphenol-A or Biphenol-F type or mixtures thereof with a viscosity vA of $500 \leq vA \leq 30\ 000$ mPas, an epoxy equivalent weight GA of $0.2 \leq GA \leq 0.6$ mol epoxy/100 g of the A component, and a mass component mA of total resin of $1\% \leq mA \leq 25\%$.

21. The method according to claim 20, wherein the one or more intermediate layers comprise a solvent-free capillary adhesive formed by curing said A component and a B component of a low-molecular and low-viscosity epoxy resin compound with at least two epoxy resin groups per molecule, and wherein the epoxy resin compound is a conversion product of an aliphatic diol with epichlorohydrine.

22. The method according to claim 21, wherein the B component of the capillary adhesive has a viscosity vB<100 mPas, an epoxy equivalent weight GB of $0.5 \leq GB \leq 1.2$ mol epoxy/100 g of the B component, and a mass component mB of total resin of $20\% \leq mB \leq 50\%$.

23. The method according to claim 20, wherein the one or more intermediate layers comprise a solvent-free capillary adhesive is formed by curing said A component and a C component comprising a liquid, low-viscosity curing component of the anhydride type with a viscosity vC of vC<100 mPas and a mass component mC of total resin of $30\% \leq mC \leq 70\%$.

24. The method according to claim 23, wherein the C component comprises a methyl cyclohexane dicarboxylic acid anhydride.

25. The method according to claim 20, wherein the capillary adhesive is formed by curing said A component and a D component comprising an amine, imidazole or metal salt complex cure accelerator with a mass component mD of total resin of $0.01\% \leq mD \leq 2\%$.

26. The method according to claim 25, wherein the D component comprises a compound selected from the group consisting of dimethyl benzylamine, diaza bicyclononane and ethyl methyl imidazole.

27. The method according to claim 20, wherein the capillary adhesive further comprises at least one additive selected from the group consisting of adhesion promoters, flexibility promoters, dyes, reactive thinners and wetting agents.

28. The method according to claim 2, wherein the core laminations have a tensile strength of 200 MPa or more.

29. The method according to claim 1, further comprising: soft-magnetic annealing of the coated sheets after applying the coating wettable with epoxy resin.

30. The method according to claim 29, further comprising: further soft-magnetic annealing after separating the core laminations.

31. The method according to claim 30, further comprising: applying an iron, cobalt and/or vanadium oxide layer to the top sides and the undersides of the soft-magnetic sheets by means of heat treatment in air and/or water vapour after said further soft-magnetic annealing.

32. The method according to claim 29, wherein the sheets of soft-magnetic, crystalline CoFe material have been cold-rolled to a thickness d of 50 μm≤d≤500 μm.

33. The method according to claim 32, wherein 50 μm≤d≤350 μm.

34. The method according to claim 29, further comprising soft-magnetic final annealing of the CoFe alloy in an inert gas atmosphere at a temperature TG of 700° C.≤TG≤900° C. for less than 10 hours.

35. The method according to claim 34, wherein the soft-magnetic final annealing process is followed by oxidation annealing in air or a water vapour atmosphere.

36. The method according to claim 1, further comprising: a soft-magnetic annealing following the separating of said sheets into said core laminations.

37. The method according to claim 1, wherein the producing of the sheets comprises slicing a soft-magnetic strip into narrower strips.

38. The method according to claim 1, wherein the applying a coating wettable with an epoxy resin comprises depositing electrically insulating and adhesive-wettable magnesium oxide layers on the top sides and the undersides of the soft-magnetic sheets.

39. The method according to claim 1, wherein the applying a coating wettable with an epoxy resin comprises depositing electrically insulating and adhesive-wettable zirconium oxide layers on the top sides and the undersides of the soft-magnetic sheets.

40. The method according to claim 1, wherein the applying a coating wettable with an epoxy resin comprises depositing electrically insulating and adhesive-wettable aluminium oxide layers on the top sides and the undersides of the soft-magnetic sheets.

41. The method according to claim 1, wherein the separating of said sheets into said core laminations comprises spark erosion, water jet cutting, etching or laser cutting, and wherein the less wettable contour surfaces of the core laminations have a lower wettability for said solvent-free, low-viscosity adhesive than the coated top sides and undersides of the core laminations.

42. The method according to claim 1, wherein the introducing of the solvent-free, low-viscosity adhesive between the core laminations in the core lamination stack comprises brushing, spraying or dipping.

43. The method according to claim 1, wherein said stacking of said core laminations comprises pressing several soft-magnetic sheets in a plane parallel manner between two steel plates acting as annealing plates in a soft-magnetic annealing process.

44. The method according to claim 1, further comprising a mechanical reworking of the laminated core following curing of the adhesive.

45. The method according to claim 44, wherein the mechanical reworking of the laminated core comprises erosion, grinding and/or milling.

46. The method according to claim 1, further comprising a physical and/or chemical cleaning process of the laminated core.

47. The method according to claim 1, wherein the solvent-free, low-viscosity adhesive comprises at least three components, a base component A having a relatively high viscosity, and B and C components having a low viscosity.

48. The method according to claim 47, wherein said base component A comprises a medium- to high-viscosity epoxy resin of the Biphenol-A or Biphenol-F type or mixtures thereof having a viscosity vA of $500 \leq vA \leq 30\ 000$ mPas, an epoxy equivalent weight GA of $0.2 \leq GA \leq 0.6$ mol epoxy/100 g of the A component and a mass component mA of total resin of $1\% \leq mA \leq 25\%$.

49. The method according to claim 47, wherein said B component comprises a low-molecular and low-viscosity epoxy resin compound with at least two epoxy resin groups per molecule, and wherein the epoxy resin compound is formed by converting an aliphatic diol with epichlorohydrine.

50. The method according to claim 49, wherein the B component has a viscosity $vB \leq 100$ mPas, an epoxy equivalent weight GB of $0.5 \leq GB \leq 1.2$ mol epoxy/100 g of the B component and a mass component mB of total resin of $20\% \leq mB \leq 50\%$.

51. The method according to claim 50, wherein the B component comprises a compound selected from the group consisting of ethylene glycol diglycidyl ether, propylene glycol diglycidyl ether and butanediol diglycidyl ether.

52. The method according to claim 47, wherein the C component comprises a liquid, low-viscosity anhydride curing component with a viscosity vC of $vC < 100$ mPas and a mass component mC of total resin of $30\% \leq mC \leq 70\%$.

53. The method according to claim 47, wherein the C component comprises a methyl cyclohexane dicarboxylic acid anhydride.

54. The method according to claim 47, wherein the solvent-free, low-viscosity adhesive further comprises a D component curing accelerator selected from an amine, imidazole or metal salt complex with a mass component mD of total resin of $0.01\% \leq mD \leq 2\%$.

55. The method according to claim 54, wherein the D component comprises a compound from the group consisting of dimethyl benzylamine, diaza bicyclononane and ethyl methyl imidazole.

56. The method according to claim 47, wherein the solvent-free, low-viscosity adhesive further comprises an additive selected from the group consisting of adhesion promoters, flexibility promoters, dyes, reactive thinners and wetting agents.

57. A method for joining core laminations to form a soft-magnetic laminated core, comprising:
   producing sheets of a soft-magnetic, crystalline CoFe material, each sheet having a top side and an underside;
   applying a coating that is wettable with epoxy resin to the top sides and undersides of each sheet during a soft-magnetic annealing process;
   separating said sheets into core laminations having a wettable coating on the top sides and undersides and having less wettable contour surfaces;
   stacking the core laminations to form a core lamination stack; and
   joining the core lamination stack by adhesive force to produce a soft-magnetic laminated core by introducing a solvent-free, low-viscosity adhesive between the core laminations in the core lamination stack, and curing the adhesive to produce electrically insulating intermediate layers between sheets of soft-magnetic material.

58. A method for joining core laminations to form a soft-magnetic laminated core, comprising:
   producing sheets of a soft-magnetic, crystalline CoFe material, each sheet having a top side and an underside;
   applying a coating that is wettable with epoxy resin to the top sides and undersides of each sheet comprising depositing electrically insulating and adhesive-wettable ceramic layers on the top sides and the undersides of the soft-magnetic sheets
   separating said sheets into core laminations having a wettable coating on the top sides and undersides and having less wettable contour surfaces;
   stacking the core laminations to form a core lamination stack; and
   joining the core lamination stack by adhesive force to produce a soft-magnetic laminated core by introducing a solvent-free, low-viscosity adhesive between the core laminations in the core lamination stack, and curing the adhesive to produce electrically insulating intermediate layers between sheets of soft-magnetic material.

* * * * *

UNITED STATES PATENT AND TRADEMARK OFFICE
CERTIFICATE OF CORRECTION

PATENT NO. : 8,943,677 B2  Page 1 of 1
APPLICATION NO. : 13/257033
DATED : February 3, 2015
INVENTOR(S) : Joachim Gerster et al.

It is certified that error appears in the above-identified patent and that said Letters Patent is hereby corrected as shown below:

IN THE SPECIFICATION

Column 5, lines 57 and 58: "0% by weight (Ta+2× Nb) 1.0% by weight"
replace with --0% by weight ≤ (Ta+2× Nb) ≤ 1.0% by weight--

Column 5, lines 63 and 64: "0% by weight (Ta+2× Nb) 1.0% by weight"
replace with --0% by weight ≤ (Ta+2× Nb) ≤ 1.0% by weight--

Column 6, lines 6 and 7: "0% by weight (Ta+2× Nb) 1.0% by weight"
replace with --0% by weight ≤ (Ta+2× Nb) ≤ 1.0% by weight--

Column 7, lines 46 and 47: "at a temperature TG of 700°CTG 900°Cfor 2 to 10 hours"
replace with --at a temperature TG of 700 °C ≤ TG ≤ 900 °C for 2 to 10 hours--

Column 10, lines 8 and 9: "at a temperature TG of 700°CTG 900°Cfor less than 10 hours"
replace with --at a temperature TG of 700°C ≤ TG ≤ 900°C for less than 10 hours--

Column 11, lines 37 and 38: "0% by weight (Ta+2× Nb) 1.0% by weight"
replace with --0% by weight ≤ (Ta+2× Nb) ≤ 1.0% by weight--

IN THE CLAIMS

Column 14, line 39, Claim 13, line 4: "0% by weight (Ta+2× Nb) ≤ 1.0% by weight"
replace with --0% by weight ≤ (Ta+2× Nb) ≤ 1.0% by weight--

Column 14, line 49, Claim 14, line 4: "0% by weight (Ta+2× Nb) ≤ 1.0% by weight"
replace with --0% by weight ≤ (Ta+2× Nb) ≤ 1.0% by weight--

Signed and Sealed this
Fifteenth Day of September, 2015

Michelle K. Lee
*Director of the United States Patent and Trademark Office*